United States Patent
Kanayama (10) Patent No.: US 8,265,474 B2
(45) Date of Patent: Sep. 11, 2012

(54) AUTOFOCUS SYSTEM

(75) Inventor: Atsushi Kanayama, Saitama (JP)

(73) Assignee: Fujinon Corporation, Saitama (JP)

( * ) Notice: Subject to any disclaimer, the term of this patent is extended or adjusted under 35 U.S.C. 154(b) by 499 days.

(21) Appl. No.: 12/370,922

(22) Filed: Feb. 13, 2009

(65) Prior Publication Data

US 2009/0238549 A1 Sep. 24, 2009

(30) Foreign Application Priority Data

| Mar. 19, 2008 | (JP) | P2008-072064 |
| Mar. 19, 2008 | (JP) | P2008-072065 |
| Mar. 19, 2008 | (JP) | P2008-072066 |
| Mar. 19, 2008 | (JP) | P2008-072067 |

(51) Int. Cl.
*G03B 3/10* (2006.01)
*G03B 13/34* (2006.01)
*G03B 15/16* (2006.01)
*G03B 39/00* (2006.01)

(52) U.S. Cl. ..... 396/95; 396/121; 396/147; 348/208.14; 348/333.12

(58) Field of Classification Search ............ 396/79, 396/89, 95, 121, 147, 76, 103; 348/208.14, 348/333.12
See application file for complete search history.

(56) References Cited

U.S. PATENT DOCUMENTS

| 5,550,928 A | 8/1996 | Lu et al. |
| 5,828,739 A * | 10/1998 | Nakanishi ................. 379/140 |
| 6,282,362 B1 * | 8/2001 | Murphy et al. ............... 386/224 |
| 6,771,899 B2 * | 8/2004 | Nonaka ........................ 396/121 |
| 6,940,545 B1 * | 9/2005 | Ray et al. .................... 348/222.1 |
| 7,317,817 B2 * | 1/2008 | Okubo et al. ................. 382/118 |
| 2003/0059092 A1 * | 3/2003 | Okubo et al. ................. 382/118 |
| 2004/0207743 A1 | 10/2004 | Nozaki et al. |
| 2005/0046730 A1 * | 3/2005 | Li ............................. 348/333.12 |
| 2005/0189419 A1 * | 9/2005 | Igarashi et al. ............... 235/454 |
| 2005/0264679 A1 | 12/2005 | Sasaki et al. |
| 2006/0083506 A1 * | 4/2006 | Kanayama .................... 396/121 |
| 2006/0088305 A1 * | 4/2006 | Ooka et al. ................... 396/121 |
| 2006/0092292 A1 * | 5/2006 | Matsuoka et al. ........ 348/231.99 |
| 2006/0104487 A1 * | 5/2006 | Porter et al. .................. 382/118 |
| 2006/0109371 A1 * | 5/2006 | Sasaki et al. ................. 348/360 |
| 2006/0140612 A1 | 6/2006 | Yata |
| 2006/0210260 A1 * | 9/2006 | Yata ............................. 396/147 |
| 2007/0086764 A1 * | 4/2007 | Konicek ......................... 396/56 |
| 2007/0285528 A1 * | 12/2007 | Mise et al. ................... 348/222.1 |
| 2008/0240503 A1 * | 10/2008 | Okada et al. .................. 382/103 |
| 2009/0066815 A1 * | 3/2009 | Nozaki et al. ............ 348/231.99 |

FOREIGN PATENT DOCUMENTS

| EP | 1 471 455 A2 | 10/2004 |
| EP | 1 560 425 A1 | 8/2005 |
| EP | 1 677 521 A1 | 7/2006 |
| EP | 1703723 A2 | 9/2006 |
| EP | 1855464 A2 | 11/2007 |
| JP | 2004-320287 A | 11/2004 |

(Continued)

*Primary Examiner* — Clayton E Laballe
*Assistant Examiner* — Warren Fenwick
(74) *Attorney, Agent, or Firm* — Birch, Stewart, Kolasch & Birch, LLP (57) ABSTRACT

Pattern data for specifying a face image of a person is registered in a pattern data storage unit 32 of a tracking device 16. When a face recognition auto-tracking mode is selected, a face image coinciding with the registered pattern data is detected, and an AF area is set to track the face image.

9 Claims, 7 Drawing Sheets

FOREIGN PATENT DOCUMENTS

| | | |
|---|---|---|
| JP | 2005-338352 A | 12/2005 |
| JP | 2006-267221 A | 10/2006 |
| JP | 2007-248615 A | 9/2007 |
| JP | 2007-279601 A | 10/2007 |
| WO | WO 2008/018887 A1 | 2/2008 |

* cited by examiner

Shooting range (shot image)

AUTOFOCUS SYSTEM

CROSS-REFERENCE TO RELATED APPLICATIONS

This application is based upon and claims the benefit of priority from the Japanese Patent Application Nos. 2008-72064, 2008-72065, 2008-72066 and 2008-72067 filed on Mar. 19, 2008; the entire contents of which are incorporated herein by reference.

BACKGROUND OF THE INVENTION

1. Technical Field

The invention relates to an autofocus system, and more particularly to an autofocus system capable of performing focus adjustment while tracking a desired subject (person) by automatically moving an autofocus (AF) target position (range) in a shooting range of a camera.

2. Description of the Related Art

There has been known an AF area auto-tracking system that is adapted to change autofocus (AF) area in accordance with movement of a subject in order to bring the subject into focus when a quickly moving subject in sporting scenes such as a soccer and a figure skating is shot by, for example, a TV camera and the like (for example, see JP 2006-267221 A (corresponding to US 2006/0140612 A).

In an imaging system (like a TV camera) that converts an image of a subject to an electric signal (image signal) by an imaging device (CCD or the like), a contrast mode is generally adopted as an autofocus (AF) mode. The contrast mode is to detect the contrast of a subject image from an image signal acquired by an imaging device, and control focus of a taking lens so that the highest contrast can be obtained, thereby automatically bring the subject into best focus.

In the AF in the contrast mode, the entire subject in the shooting range of a camera is not set to the target of the AF, but only a subject in a pall of the shooting range is processed as the AF target in many cases. In the AF in the contrast mode, the image signals in the target range of the AF are extracted from the image signals acquired from the entire imaging area of the imaging device, and the target of the AF is limited only to the subject in a part of the range by controlling the focus so that the contrast of the extracted image signal in that range is maximized. In this specification, a subject range, being a target of the AF, in a shooting range of a camera or an image range of a target subject, being a target of the AF, in a shot image of a camera will be referred to as an "AF area", and a frame indicating an outline of the AF area will be referred to as an "AF frame".

In a lens system for broadcast, a cameraman performs a pan/tilt (P/T) operation and a zooming operation in order to capture a quickly moving subject like a figure skater. However, in such a situation, it is very difficult to move the AF area. In this case, the above-mentioned AF area auto-tracking system is useful.

However, for example, in the case where a soccer game is shot, for example, the case where a large number of subjects move similarly in a shooting range, it is difficult to continuously track a specific subject that is previously recognized by means of a simple pattern recognition technique, and the tracking target would be changed. As a result, there is a possibility that an image of the subject to be tracked originally might be blurred.

Furthermore, in a face recognition technique provided to recent digital cameras, it is effective to simply extract a person in a shooting range. However, in the case where not only a specific person but also a plurality of persons exist in a frame, it is difficult to recognize the specific person just by setting an AF frame onto a face. Thus, there is a possibility that the target of the AF may be changed to another person.

SUMMARY OF THE INVENTION

The invention has been made in view of the above circumstances and provides an autofocus system capable of performing auto-tracking by setting a specific subject (person's face or the like) as a target of the AF.

[1] According to an aspect of the invention, an autofocus system includes an imaging unit, an autofocus unit, a pattern registration unit, a tracking target detection unit and a tracking unit. The imaging unit takes a subject image formed by an optical system. The autofocus unit performs focus adjustment of the optical system so as to bring into focus a subject in a predetermined AF area in a shot image taken by the imaging unit. The pattern registration unit registers pattern data for specifying a subject. The tracking target detection unit detects a tracking target subject among subjects in the image taken by the imaging unit, based on the pattern data registered in the pattern registration unit. The tracking unit moves the AF area in accordance with movement of the tracking target subject detected by the tracking target detection unit.

[2] In the autofocus system of [1], the tracking target detection unit may include a subject detection unit that detects at least one subject that is of a same type as the subject of the pattern data registered by the pattern registration unit, among the subjects in the image taken by the imaging unit. The tracking target detection unit may detect the tracking target subject among the at least one subject, which is detected by the subject detection unit, based on the pattern data registered by the pattern registration unit.

[3] The autofocus system of [2] may further include a title registration unit and a title display unit. The title registration unit registers a title for identifying the subject of which the pattern data is registered when the pattern data is registered by the pattern registration unit. When the tracking target subject is detected by the tracking target detection unit, the title display unit displays the title registered by the title registration unit in a screen of a viewfinder for displaying a currently shot image so that the displayed title corresponds to the detected subject.

[4] The autofocus system of [3] may further include a selection unit that turns on/off displaying the title in the screen of the viewfinder.

[5] In the autofocus system of any one of [1] to [4], the pattern registration unit may cause the imaging unit to take the subject, read pattern data of the shot subject from the taken image and register the read pattern data of the shot subject.

[6] In the autofocus system of any one of [1] to [5], the pattern data may include data representing a face of a specific person.

[7] In the autofocus system of [2], the pattern data may include data representing a face of a specific person, and the subject detection unit may recognize a person's face image.

With the configurations of [1] to [7], only the subject of which pattern is registered in advance is automatically tracked, and is brought into focus by the AF.

Furthermore, the specific subject (person's face or the like) is set as the target of the AF, thereby enabling the auto-tracking.

As described above, in a face recognition technique provided to recent digital cameras, it is effective to simply extract a person in a shooting range. However, in the case where not only a specific person but also a plurality of persons exist in the frame, it is difficult to recognize the specific person just by setting an AF frame onto that face. Thus, there is a possibility that the target of the AF may be changed to another person.

A face (object) recognition technique that is recently used for security purpose is effective in identifying and recognizing a specific person's face (object). However, the configuration capable of automatically tracking just one person's face or just one object is inconvenient to use.

In view of this circumstance, the following autofocus system may be provided. That is, the autofocus system can register data (pattern data) for specifying a plurality of persons' faces or objects, and perform auto-tracking in accordance with designation of a desired person's face or object among the plurality of person's faces or objects.

[8] In the autofocus system of [1], the pattern registration unit may register plural pieces of pattern data for specifying a plurality of subjects, respectively. The autofocus system may further include a tracking target designation unit that designates one subject from among the subjects of which pattern data are registered by the pattern registration unit. The tracking target detection unit detects the subject, which is designated by the tracking target designation unit, as the tracking target subject from among the at lease subject in the image taken by the imaging unit, based on the pattern data registered by the pattern registration unit.

[9] In the autofocus system of [8], the autofocus system may have a preset shooting function for setting at least one of zooming and focusing of the optical system to a preset position that is registered in advance. An operation member that is used in the preset shooting function may be used as an AF tracking operation member that is used in the pattern registration unit and the tracking target designation unit, by changing a mode by a predetermined switch.

With the configurations of [8] to [9], it is possible to register the plural pieces of pattern data for specifying the plurality of persons' faces or objects, and it is also possible to perform auto-tracking by designating a desired person's face or object among the plurality of person's faces or objects. Accordingly, it is possible to easily change the auto-tracking target.

By the way, there is a related art that has a preset shooting function for previously registering a preset position of the zooming and focusing, and changing the set zooming and focusing from an optional position to the preset position by operating a predetermined reproduction instruction. When the preset shooting function is used, a subject is previously determined in most cases. Hence, it is preferable that an auto-tracking target subject is set when the zooming and focusing are reproduced to be set to the preset position.

In view of the above circumstance, the following autofocus system may be provided. That is, the autofocus system can set a previously determined subject as an automatically tracking subject while reproducing the zooming and focusing to the preset position.

[10] The autofocus system of [1] may further includes a preset position registration unit that registers at least one preset position of zooming and focusing of the optical system in association with the tracking target subject, which is registered by the pattern registration unit. When the pattern registration unit gives an instruction to automatically track the subject of which pattern data is registered, the tracking target detection unit may set at least one of the zooming and focusing of the optical system to the preset position, which is registered by the preset position registration unit. When the AF area is moved in accordance with movement of the tracking target subject, which is detected by the tracking target detection unit, the tracking unit may cause the autofocus unit to perform the focus adjustment so as to bring into focus the tracking target subject.

With the configuration of [10], the zooming and focusing is reproduced to be set to the preset position of performed, and the automatically tracking target subject is set as the previously determined subject. Accordingly, an operator can perform these processes by a simple operation.

Also, the inventor studied that when the technique for identifying and recognizing a specific person's face (object) is introduced to an AF area auto-tracking system, what is to be displayed on a viewfinder for displaying a shot video that is currently being shot by camera.

When a face of a specific person (individual) or object is recognized so that the specific person (individual) or object can be automatically tracked, an autofocus system that is can appropriately display related information on a viewfinder may be provided.

[11] In the autofocus system of [3], the pattern registration unit may register plural pieces of pattern data for specifying a plurality of subjects, respectively. The title registration unit may register a plurality of titles for identifying the plurality of subjects of which pattern data are registered, respectively. The tracking target detection unit may further include a registration subject detection unit and a tracking target determination unit. The registration subject detection unit detects at least one subject, which is registered by the pattern registration unit, from among the at least one subject, which is detected by the subject detection unit, based on the pattern data, which is registered by the pattern registration unit. The tracking target determination unit determines the tracking target subject from among the at least one subject detected by the registration subject detection unit. The tracking unit may move the AF area in accordance with movement of the tracking target subject determined by the tracking target determination unit of the tracking target detection unit. The autofocus system may further include a frame display unit that displays a frame surrounding the at least one subject, which is detected by the subject detection unit, on the screen of the viewfinder. The title display unit may display on the screen of the viewfinder the title, which is registered by the title registration unit, with respect to the at least one subject, which is detected by the registration subject detection unit.

[12] In the autofocus system of [11], the title display unit may display on the screen of the viewfinder information that indicates non-registration with respect to the subject, which is detected by the subject detection unit and is not registered by the pattern registration unit.

[13] The autofocus system of any one of [11] to [12], may further include an instruction unit that tuns on/off displaying the title and displaying the information, which indicates non-registration, by of the title display unit.

[14] in the autofocus system of any one of claims 11 to 13, the frame display unit may display the frame of the subject, which is determined as the tracking target by the tracking target determination unit, in a different color from that of a frame of a different subject.

With the configurations of [11] to [14], it is possible to easily check on the screen of the viewfinder that a subject of which pattern data is registered exists in a shot image by use of the title display. Furthermore, it is also possible to easily distinguish between a registered subject(s) and a non-registration subject(s).

When a face of a specific person (individual) or object is recognized so that the specific person (individual) or object can be automatically tracked, it is possible to appropriately display related information on the viewfinder.

DETAILED DESCRIPTION OF EMBODIMENTS OF THE INVENTION

Hereinafter, with referring to the accompanying drawings, an autofocus system according to embodiments of the invention will be described in detail.

Figure 1:
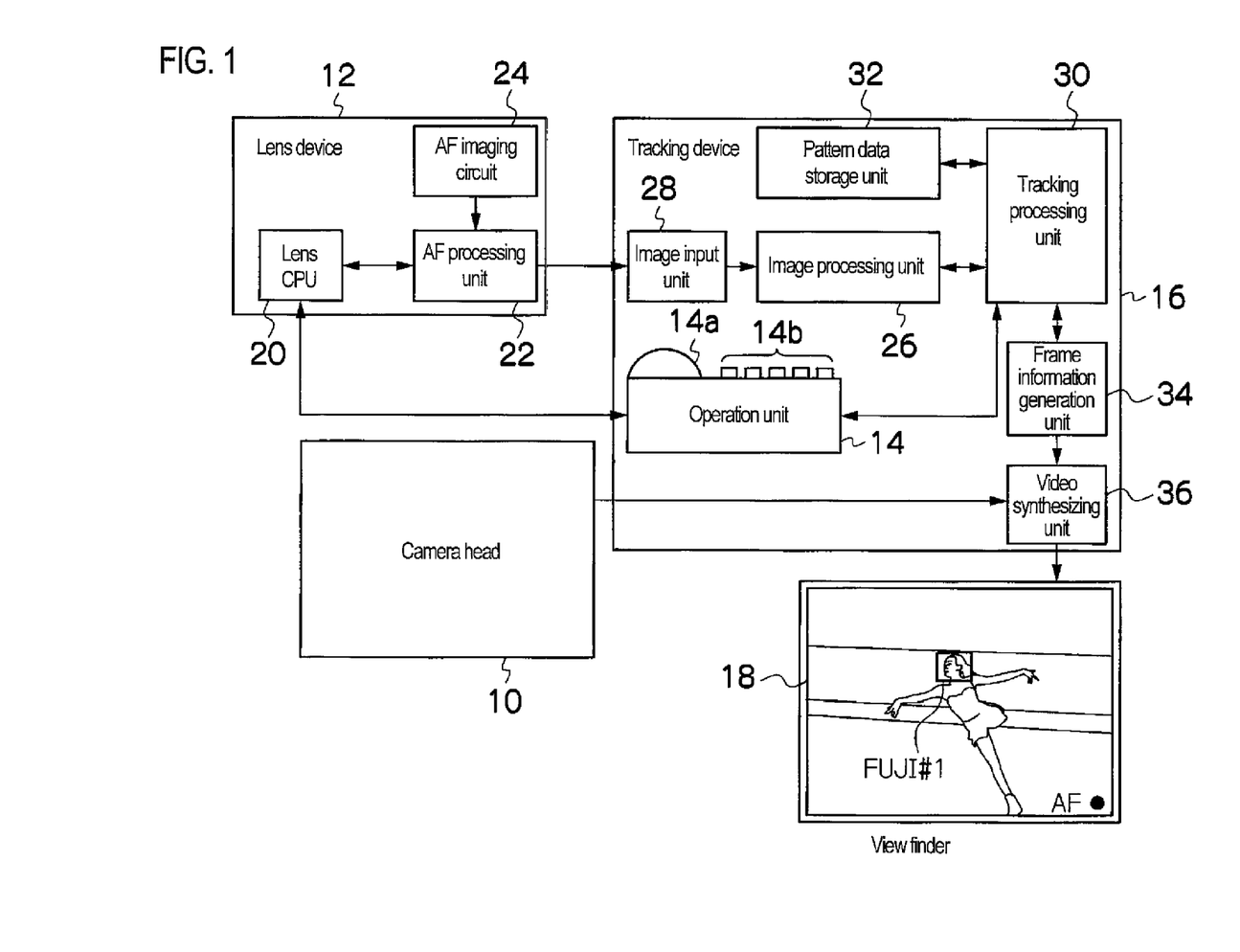
FIG. 1 is a block diagram showing the overall configuration of an imaging system to which an autofocus system according to an embodiment of the invention is applied.

FIG. 1 is a block diagram showing the overall configuration of the imaging system to which the autofocus system according to an embodiment of the invention is applied. The imaging system shown in the drawing is, for example, an imaging system that is used to shoot an image by a TV camera for broadcast. FIG. 1 shows a camera head 10 whose lens can be replaced, a lens device 12 that has a taking lens (optical system) attached to a lens mount of the camera head 10, a tracking device 16 that includes an operation unit 14, and the like.

The camera head 10 is mounted with an imaging device (for example, a CCD), a signal processing circuit, and the like. An image formed by the taking lens of the lens device 12 is photoelectrically converted by the imaging device, and then signal processing is performed for the image by the signal processing circuit. A video signal of a certain format is generated by the signal processing circuit, and is output from a video signal output terminal or the like of the camera head 10 to an external equipment.

Furthermore, the camera head 10 is provided with a viewfinder (monitor) 18. On the viewfinder 18, a real-time image (video) that is currently being shot by the imaging device of the camera head 10 is displayed to check composition thereof. That is, a video signal of the video, which is currently being shot by the imaging device, is output from the camera head 10, the video signal is input to the viewfinder 18 through a video synthesizing unit 36 of the tracking device 16 (which will be described later), and the video signal is displayed as a real-time image that is currently being shot on a screen of the viewfinder 18. Furthermore, the viewfinder 18 may be set or disposed on an optional location other than the camera head 10.

The lens device 12 is provided with the taking lens (optical system), which is not shown in the drawings and is attached to the lens mount of the camera head 10. The taking lens forms an image of a subject on an imaging surface of the imaging device of the camera head 10. The taking lens includes, as its elements, movable portions for adjusting a shooting condition. The movable portions such as a focus lens group, a zoom lens group, and an aperture diaphragm are electrically driven by a motor (servomechanism) not shown in the drawings. For example, the focus lens group and the zoom lens group move in an optical axis direction, the movement of the focus lens group adjusts a focus (subject distance), and the movement of the zoom lens group adjusts a focal length (zoom power). In a system that only relates to control of autofocus, at least the focus lens group may be electrically driven, and the other movable portions may be only driven manually. When a certain movable portion is electrically driven by an operator's operation, the certain movable portion is controlled based on control signals output from an operation unit (an operation unit of a controller connected to the lens device 12 or the like), which is not shown in the drawings, in accordance with the operator's operation, but details thereon are omitted here.

As shown in the drawing, the lens device 12 is mounted with a lens CPU 20 for integrally controlling the entire lens device 12, an AF processing unit 22 that executes autofocus (AF) processing, an AF imaging circuit 24, and the like. The AF imaging circuit 24 is disposed on the lens device 12 in order to acquire a video signal for AF process. The AF imaging circuit 24 includes the imaging device (CCD or the like) and the processing circuit for outputting an output signal of the imaging device as the video signal in the certain format, and the like. The imaging device of the AF imaging circuit 24 may be referred to as an "AF imaging device". It is assumed that the video signal output from the AF imaging circuit 24 is a luminance signal. Light is branched from subject light incident on the imaging device of the camera head 10 by the use of a half mirror or the like disposed on a light path of the taking lens, and the branched light forms an image on the imaging surface of the AF imaging device. A shooting range and a subject distance (a distance at which a subject can be focused to) for an imaging area of the AF imaging device are configured to match a shooting range and a subject distance for an imaging area of the imaging device of the camera head 10. A subject image acquired by the AF imaging device substantially matches a subject image acquired by the imaging device of the camera head 10. It is not necessary for the both shooting ranges to be completely matching. For example, the shooting range of the AF imaging device may be large enough to contain include the shooting range of the imaging device of the camera head 10.

The AF processing unit 22 acquires the video signal from the AF imaging circuit 24, and calculates a focus evaluation value indicating a level of a contrast of the subject image based on the video signal. For example, high-frequency component signals of the video signal acquired from the AF imaging device are extracted by a high-pass filter, and then of the high-frequency component signals, signals in a range corresponding to an AF area (a subject area to be brought into focus by the AF) that is an AF target range are integrated for each screen (frame). An integrated value thus acquired for each screen indicates the level of the contrast of the subject image, and is given to the lens CPU 20 as the focus evaluation value. Furthermore, the range of the AF area is designated by the lens CPU 20 as will be described later.

Figure 2:
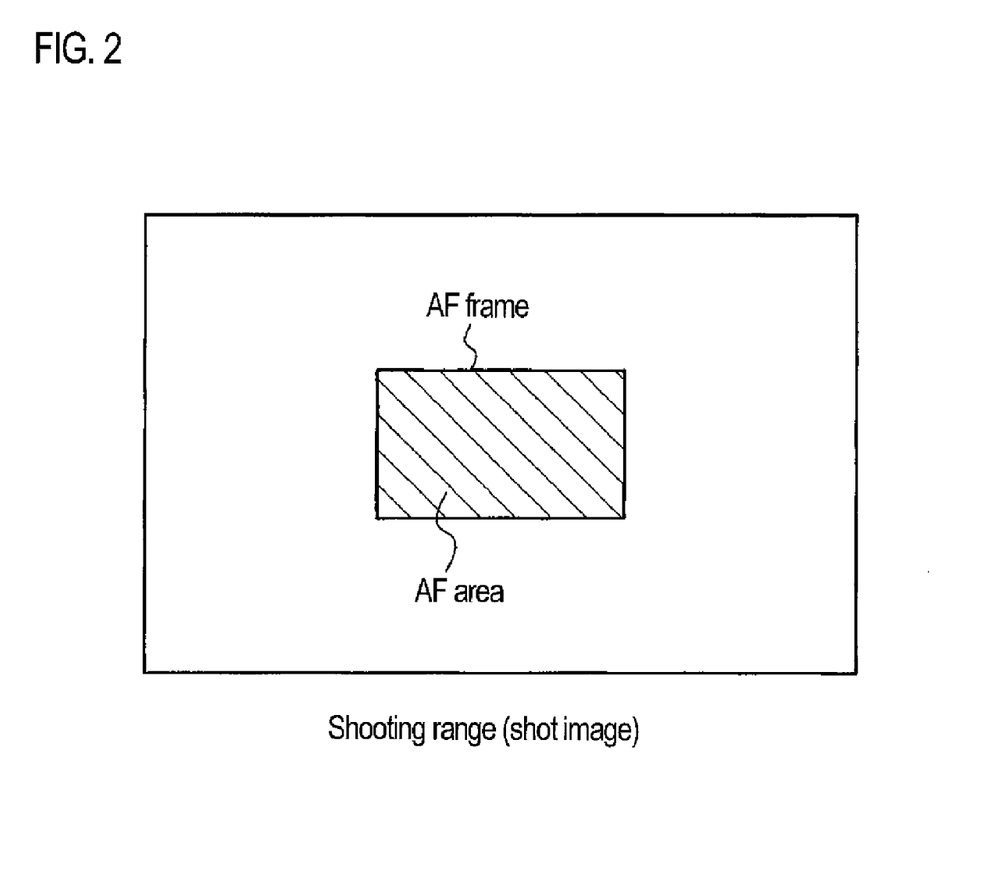
FIG. 2 is an explanatory diagram showing an example of an AF area (AF frame).

As will be described in detail later, the lens CPU 20 acquires information (AF frame information) of the AF frame indicating a range (outline) of the AF area from an operation unit 14 of the tracking device 16, and informs of the AF processing circuit 22 a range in the AF frame that is designated by the AF range information as the AF area. FIG. 2 shows an example of the AF area (AF frame), in which the AF area having a rectangular shape is set in the shooting range and the outline thereof corresponds to the AF frame. The lens CPU 20 informs the AF processing circuits 22 of the above-mentioned AF area, and then acquires from the AF processing unit 22 the focus evaluation value, which is acquired from the image (video signal) in the AF area. In this manner, whenever a video signal for each screen is acquired from the AF imaging circuit 24 (whenever a focus evaluation value is acquired from the AF processing unit 22), the lens CPU 20 acquires the focus evaluation value from the AF processing unit 22, and controls the focus lens group so as to maximize the acquired focus evaluation value (to take a local maximum value), that is, maximize the contrast of the subject image in the AF area. For example, a climbing mode is generally known as a mode of controlling the focus lens group based on the focus evaluation value. In this mode, the focus lens group is moved in a direction for increasing the focus evaluation value, and then if a point at which the focus evaluation value starts to decrease is detected, the focus lens group is set to the detected point. Thus, it is possible to automatically bring the subject in the AF frame into focus.

In this embodiment, as described above, the AF processing unit 22 is configured to acquire the video signal for detecting the contrast of the subject image from the AF imaging circuit 24, which is mounted on the lens device 12. However, the video signal acquired from the video shot by the imaging device of the camera head 10 may be acquired from the camera head 10. Also, the AF mode is not limited to the contrast mode mentioned above.

The tracking device 16 is a device for tracking a certain subject (person's face or the like) on the screen in order to keep the certain subject being within the AF area. The tracking device 16 includes the operation unit 14, an image processing unit 26, an image input unit 28, a tracking processing unit 30, a pattern data storage unit 32, a frame information generation unit 34, a video synthesizing unit 36, and the like.

In the tracking device 16, the following basic processes are performed. That is, the basic procedures include: an AF area setting process for setting (determining) an AF area (AF frame) that is used in the AF processing unit 22 of the lens device 12; an auto-tracking process for automatically tracking a tracking target object; a person specification process for recognizing (detecting) a face image of a person in a shot video and specifying a person of the recognized face image; a pattern registration process for registering a pattern of the face image of the person specified by the person specification process; a frame display process for displaying the shot video together with an AF frame or a tracking frame (face frame) on a viewfinder 18. These processes are adapted to be integrally performed by the tracking processing unit 30.

The AF area setting process is a process for setting a range (position, size, shape) of the AF area (AF frame) and transmitting AF frame information indicating the set an AF area range to the lens CPU 20 of the lens device 12. Thereby, the lens CPU 20 sets the AF area, which is used in the AF processing unit 22, in accordance with the AF frame information.

When the auto-tracking is executed which will be described later (when the auto-tracking is turned on), the auto-tracking process is performed by the tracking processing unit 30, and a position of the AF area and the like are changed and set in accordance with a position of the tracking target, which is the AF target. Then, the AF frame information indicating the AF area range set by the tracking processing unit 30 is transmitted to the lens CPU 20 of the lens device 12 through the operation unit 14.

In contrast, when the auto-tracking is not executed (when the auto-tracking is turned off), the AF area range is fixed unless an operator performs an operation for changing the AF area range using the operation unit 14. For example, at an initial state, a rectangular area that has a predetermined size and is located in the center of the screen (shooting range) is set as the AF area.

When the operator operates an operation member of the operation unit 14 for setting the AF area, the AF area range is changed in accordance with the manual operation. In this embodiment, it is assumed that the operator can change only the position of the AF area. The operation unit 14 is provided with a track ball 14*a*. When the operator operates the track ball 14*a*, a new AF area position is obtained by moving an AF area from the current AF area position in a moving direction corresponding to an operation direction of the track ball 14*a* and by a moving distance corresponding to an operation amount of the track ball 14*a*. Then, AF frame information indicating a range of the changed AF area is transmitted to the lens CPU 20 of the lens device 12, and the AF area position is set in accordance with the operation of the track ball 14*a*.

Furthermore, when a manual operation for changing the AF area range is performed by using the operation unit 14 even in a state where the auto-tracking is turned on, priority is given to the AF area change based on the manual operation over the AF area change based on the auto-tracking by the tracking processing unit 30.

Furthermore, the operation unit 14 is provided with other elements not shown in the drawings. The other components include, for example, detection circuits (sensor, switch, and the like) for detecting operations of the respective operation members and a simple processing unit for generating required information such as AF frame information based on output signals of these detection circuits and outputting the generated information to the lens device 12 and/or the tracking processing unit 30. However, it is not always necessary to provide such a processing unit. Specifically, all of processes performed in the processing unit of the operation unit 14 may be performed in the tracking processing unit 30, which acquires the outputs of the detection circuits of the operation unit 14, and the information (AF frame information and the like) required for the lens CPU 20 may be transmitted directly from the tracking processing unit 30. Alternatively, the output signals required for processes of the tracking processing unit 30 and the lens CPU 20 may be acquired directly from the detection circuit of the operation unit 14.

Furthermore, the operation unit 14 is an element included in the tracking device 16, but may be formed as a device that is separate from the tracking device 16, and may be adapted to be connected to the tracking device 16 via a cable or the like.

The auto-tracking process is a process for automatically tracking an object set as a tracking target (which will be described later) on the screen when the auto-tracking is turned on. In a step before start of the tracking process, an image area of a tracking target object or an image area including an image of the tracking target object is determined, which corresponds to, for example, the image area of the AF area, the image area of a person's face detected in a person specification process (which will be described later), or the like. Since the auto-tracking method is well known, detailed description thereof will be omitted. When the tracking processing unit 30 performs the auto-tracking process, frame images (shot images) that are taken sequentially by AF imaging circuit 24 of the tens device 12 are sequentially introduced into the image processing unit 26 through the AF processing unit 22 and the image input unit 28 of the tracking device 16. Then, image areas of the tracking target object are detected sequentially from a frame image at the beginning of the auto-tracking, thereby tracking positions of the tracking target object in the images. Even if a plurality of tracking targets exist in an image, it is also possible to track the respective tracking targets.

The person specification process is a process for recognizing (detecting) a person's face (face image) included in a shot image through a face recognition process and specifying a person of the recognized face. In this embodiment, types (modes) of auto-tracking include an area auto-tracking mode and a face recognition auto-tracking mode. In the area auto-tracking mode, an optional object in the currently set AF area is determined as a tracking target to be tracked as an AF target. In the face recognition auto-tracking mode, a specific person's face in a shot image is determined as a tracking target to be tracked as an AF target. Furthermore, the area auto-tracking mode is performed when an area auto-tracking switch (not-shown) of the operation unit 14 is turned on, and the face recognition auto-tracking mode is performed when the face recognition auto-tracking switch of the operation unit 14 is turned on.

The person specification process is a process performed in the face recognition auto-tracking mode. If the face recognition auto-tracking mode is activated, the tracking processing unit 30 starts a process in which frame images sequentially that are taken by the AF imaging circuit 24 of the lens device 12 are sequentially introduced into the image processing unit 26 through AF processing unit 22 and the image input unit 28 of the tracking device 16. Then, the well-known face recognition process is performed for an initial frame image introduced into the image processing unit 26, thereby detecting a person's face (face image) in the frame image. For example, a face image is detected based on a general shape of a person's face and a color of a person's face.

If the face image is detected by the face recognition process, subsequently, a person of the detected face image is specified by the well-known face authentication process. For example, if pattern data of a face of person to be specified are previously registered in the pattern data storage unit 32, and if the face image detected by the face recognition process coincides with the pattern data registered in the pattern data storage unit 32, then the face image is specified as the person of the face of the pattern data. In this embodiment, pattern data of a plurality of persons' faces may be previously registered in the pattern data storage unit 32. Thus, if a face image corresponds to any of the registered pattern data, a person of the face image is specified.

As described above, when a specific person's face image in the shot image is specified by the person specification process, the face image is set as a tracking target that is automatically tracked as the AF target. When a plurality of persons' face images are specified, the face image automatically tracked as the AF target is selected from among any one of the person's face images. For example, when the pattern data storage unit 32 stores pattern data of a plurality of persons and when two or more face images of the persons simultaneously exist in a shot video, a priority as to which person's face image to be selected as the AF target may be set up in advance, or an operator may designate one of the two or more persons by a predetermined operation.

The pattern registration process is a process for previously registering as pattern data a pattern of a face image of a person to be specified by the above-mentioned person specification process. In order for an operator previously to register a pattern of at least one person's face image before the face recognition auto-tracking mode is executed, the pattern registration process is performed when a pattern registration mode switch of the operation unit 14 is turned on to activate a pattern registration mode.

When the pattern registration mode is activated, the tracking processing unit 30 starts a process in which frame images that are sequentially taken by the AF imaging circuit 24 of the lens device 12 are sequentially introduced into the image processing unit 26 through AF processing unit 22 and the image input unit 28 of the tracking device 16. Then, the well-known face recognition process is performed for an initial frame image introduced into the image processing unit 26, thereby detecting a person's face image in the frame image. An operator can recognize the detected face image from a frame (face frame) display that is superimposed on a shot video and is displayed together with the shot video on the viewfinder 18 through a frame display process (which will be described later).

When a plurality of detected face images exist, the operator selects a face image to be registered. For example, a certain face image is already selected at an initial step. At this time, in the viewfinder 18, the selected face image and an unselected different face image can be distinguished based on color difference between the face frames or the like. If the operator operates the track ball 14*a* of the operation unit 14 in a direction from the currently selected face image toward a face image to be registered, the selected face image can be changed into the face image to be registered. Furthermore, a desired face image may be selected by changing a shooting direction of the camera to place a face image that the operator wants to select in the AF area (that is, to overlap a face frame that the operator wants to select with the AF area). Further, a shooting angle of view can be freely changed unless an actual shooting is being performed. Thus, only a desired face image may be selected by performing the pan/tilt operation of the camera and the zooming operation so that only the desired face image is included in a shot image. Furthermore, if the pattern registration mode is activated in a state where only a face image of a person that the operator wants to register is being shot from the beginning, the above-mentioned work for selecting a face image to be registered becomes needless.

As described above, when a face image of a person to be registered is selected, the tracking processing unit 30 samples pattern data of the selected face image. At this time, plural pieces of pattern data for one person to be registered may be registered. If the operator takes a face image(s) of a person to be registered and determines that pattern data of a face image(s) obtained by shooting the face from a required direction(s) (for example, shooting the face when that person changes his/her face direction) has been sampled, the operator terminates the sampling by a predetermined operation. In this manner, the pattern data at the time of taking three-dimensionally a face image(s) of the person to be registered is obtained. As described above, the sampled pattern data is registered with a title for identifying the person in the pattern data storage unit 32.

The operation unit 14 is provided with a plurality of press button type switches 14*b* shown in FIG. 1. For example, when the pattern registration mode is to be activated, a switch corresponding to a person whose pattern data will be registered is designated by turning any one of the plurality of switches 14*b* on. Thereby, the pattern data can be registered so that one person corresponds to the switch turned on. Then, in the face recognition tracking mode, which person's face to be tracked as the AF target can be selected by turning on a switch corresponding to one person among the persons whose pattern data are registered. Furthermore, correspondence between the switches 14*b* and the registered persons may be automatically established in a registration order of pattern data.

Also, when the pattern data is registered, information such as a title of the registered person can be registered, and the data is also registered with the pattern data in the pattern data storage unit 32. To input the title and the like, an apparatus such as PC having a character input device may be connected to the tracking device 16, and information input to the apparatus may be introduced. Alternatively, the operation unit 14 may be configured so that the character input device may be provided or connected thereto and the character input device may make an input.

The frame display process is a process for displaying frame images such as an AF frame and a tracking frame (face frame) on the viewfinder 18 by superimposing the frame images onto a shot video. When positions and sizes of frames having rectangular shapes surrounding an AF frame and/or a tracking target on a shot video are determined, the tracking processing unit 30 transmits that information to the frame information generation unit 34 to generate images of those frames. Furthermore, not only the images of the frames but also colors of the frames, character information accompanied with the frames, and the like are generated in accordance with an instruction of the tracking processing unit 30. The images of the frames generated by the frame information generation unit 34 are transmitted to the video synthesizing unit 36. A video signal of a shot video that is currently being taken by the imaging device of the camera head 10 is input to the video synthesizing unit 36. The video synthesizing unit 36 generates a synthesized video signal formed by synthesizing the video signal and the images of the frames transmitted from the frame information generation unit 34, and outputs the resultant video to the viewfinder 18. Accordingly, the images such as the AF frame and the tracking frame (face frame) are displayed at corresponding positions on the viewfinder 18 by being superimposed onto the shot video.

Furthermore, for example, a title such as "FUJI#1" is displayed for a face frame, and information indicating that the AF is running is displayed on a lower side of the screen.

Figure 3A:
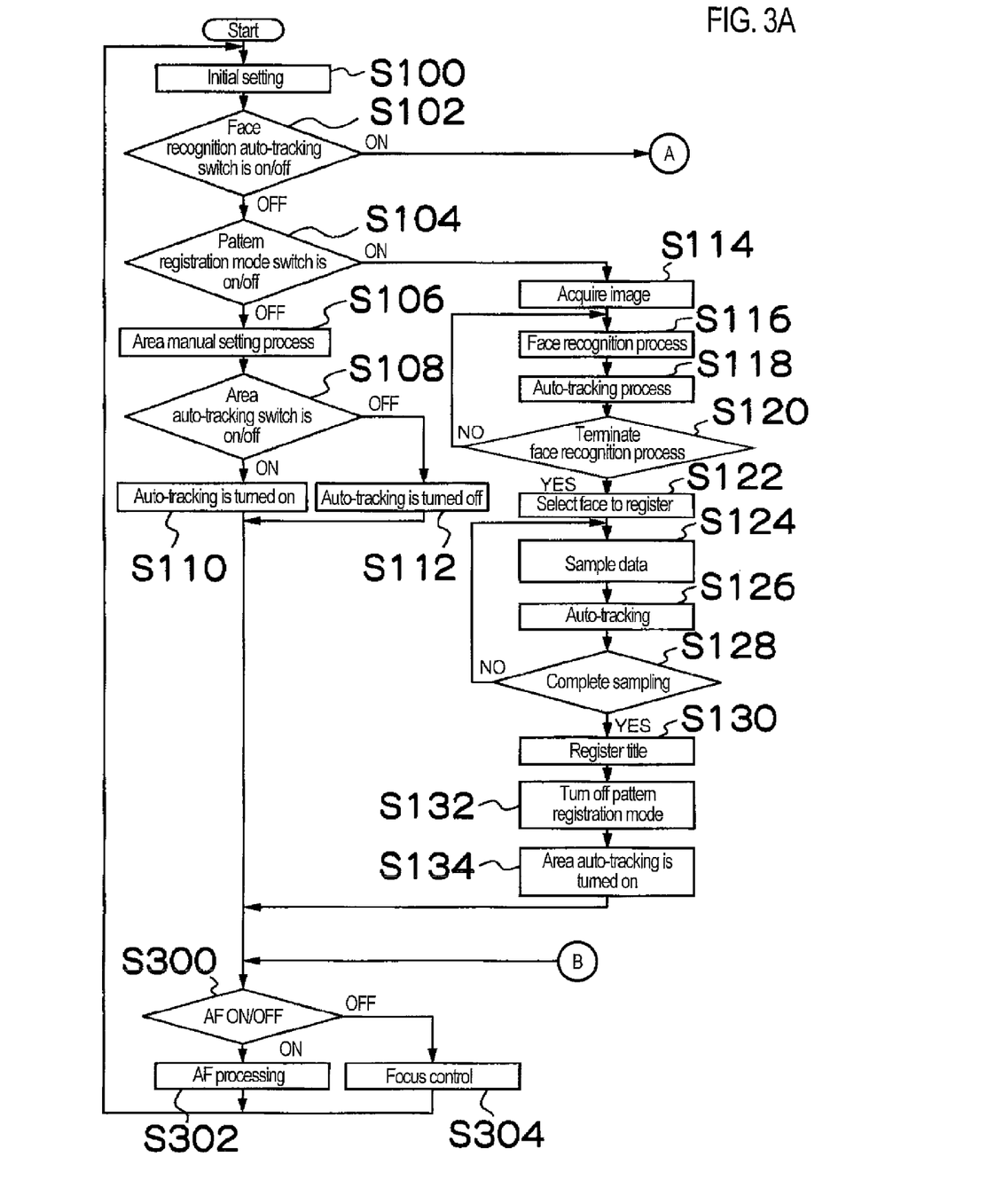
FIGS. 3A and 3B are flowcharts showing a basic process procedure of the autofocus system according to the embodiment.
Figure 3B:
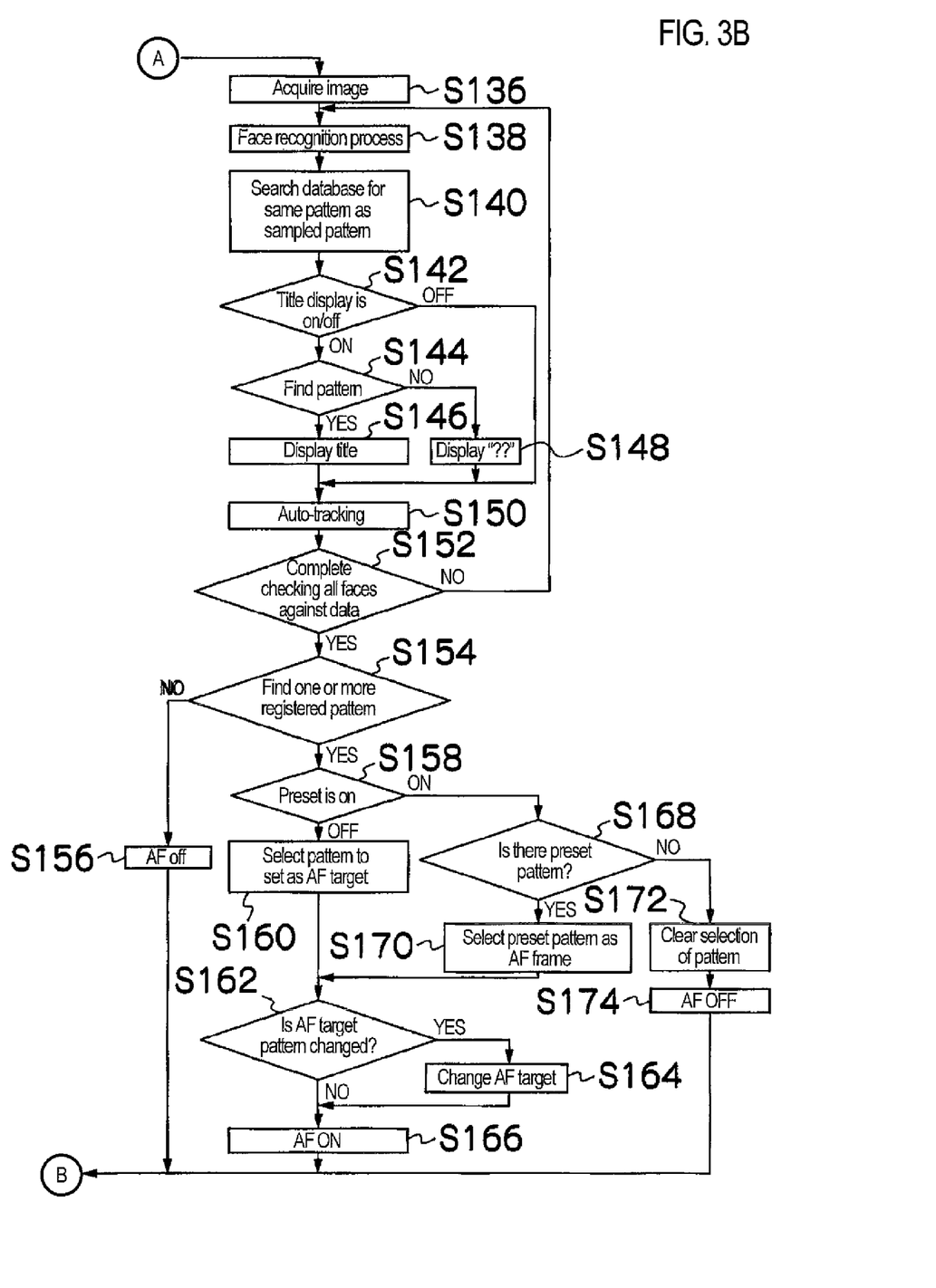

Next, a basic process procedure (first embodiment) of the autofocus system shown in FIG. 1 will be described with reference to the flowchart of FIGS. 3A and 3B.

When a power source is turned on, first, the lens CPU 20 of the lens device 12 and the tracking processing unit 30 of tracking device 16 perform an initial setting (step S100). Subsequently, the tracking processing unit 30 determines as to whether or not the face recognition auto-tracking switch is turned on (step S102). If the face recognition auto-tracking switch is turned on, a process of the face recognition auto-tracking mode is performed, and a process procedure at this time will be described later.

If the determination result in step S102 is NO (OFF), then it is determined as to whether or not the pattern registration mode switch is turned on (step S104). If the pattern registration mode switch is turned on, the registration process (pattern registration process) of the pattern data is performed, and a process procedure at this time will be described later.

If the determination result in step S104 is NO (OFF), an area manual setting process is performed (step S106). That is, when an operator operates the track ball 14a of the operation unit 14, a range of AF area is set in accordance with the operator's operation.

Next, it is determined as to whether or not the area auto-tracking switch is turned on (step S108). If the determination result is YES (ON), the tracking processing unit 30 starts the auto-tracking process in the area auto-tracking mode as described above (step S110), and the flow proceeds to step S300. That is, the tracking processing unit 30 sets as a tracking target a subject that is in an AF area when the area auto-tracking switch is turned on, and thus changes a position of the AF area in accordance with a position of the tracking target. If the determination result in step S108 is NO (OFF), the auto-tracking process is turned off (stopped) (step S112), and the flow proceeds to step S300.

Subsequently, the flow advances to step S300, then the lens CPU 20 determines as to whether the AF is turned ON or OFF. This determination process makes a determination based on ON/OFF of the AF switch (not-shown) for instructing start and end of the AF.

If the determination result in step S300 is YES (ON), the AF process is performed (step S132). Thus, the focus lens is automatically controlled to be focused on the subject in the AF area set as described above.

If the determination result in step S300 is NO (OFF), the operator controls a focusing in a manual focus operation (step S134). If the processes in step S132 or S134 is completed, then the flow returns to step S102.

On the other hand, if the determination result in the step S104 is YES (ON), that is, if the pattern registration mode switch is turned on and it is determined that the mode has been set to the pattern registration mode, the tracking processing unit 30 performs the pattern registration process in the following manner.

First, the tracking processing unit 30 of the tracking device 16 starts to introduce frame images, which are sequentially taken in the AF imaging circuit 24 of the lens device 12, to the image processing unit 26 (step S114). Subsequently, the tracking processing unit 30 performs the face recognition process for each image introduced to the image processing unit 26, and recognizes (detects) a person's face image included in the image (step S116). Furthermore, even if a plurality of face images exist in the image, the flow proceeds to the following step S118 at the time when one face image is recognized. Further, when the tracking processing unit 30 detects a face image, a face frame of the recognized face image is superimposed and displayed on a shot video that is being displayed on the viewfinder 18 by the frame display process.

Next, the tracking processing unit 30 sets the face image recognized in step S116 as a tracking target, and starts the auto-tracking process (step S118). The face frame in the viewfinder 18 is also changed in accordance with movement of the face image.

Subsequently, it is determined as to whether or not the face recognition process is to be terminated (step S120). For example, if no face image is newly detected in the face recognition process of step S116, then the face recognition process is terminated.

If the determination result in step S120 is NO, the flow returns to step S116, and repeats the face recognition process.

If the determination result in step S120 is YES, a face image that the operator wants to register is selected from among the face image(s) recognized in step S116 (step S122).

Next, the tracking processing unit 30 samples pattern data of the face image selected as the face image to be registered (step S124). The sampled pattern data is registered (stored) in a database of the pattern data storage unit 32.

Subsequently, the auto-tracking process for tracking the selected face image is started (step S126). Then, it is determined as to whether or not the sampling is completed (step S128). For example, the operator can give an instruction to determine as to whether or not the sampling is completed by the means of the predetermined switch.

Here, if the determination result is NO, the flow returns to the process of step S124, and continues the sampling. That is, the pattern data sampling is repeatedly performed until pattern data is obtained by shooting the person's face to be registered in as many directions (angle) as possible. Accordingly, plural pieces of pattern data for one person are registered in the database of the pattern data storage unit 32.

If the determination result in step S128 is YES, a title (such as a name, number, and the like) for identifying the person of the registered face image is registered (step S130). If the title for the registered face image is registered and if the registered face image is detected in the face recognition tracking mode, the title like "FUJI#1" can be displayed for the face frame of the face image on the display screen of the viewfinder 18 as shown in FIG. 1.

When the above-mentioned pattern registration process is completed, the tracking processing unit 30 inactivates the pattern registration mode (step S132). Then, the AF area is set to include the face image of which pattern data is registered, and the auto-tracking process for automatically tracking the face image as the AF target is started (step S134). That is, the registered face image is automatically tracked as a tracking target, and the AF area is changed in accordance with movement of the registered face image. Also, the face frame may be set as the AF area. After the auto-tracking process of step S134 is started, the flow proceeds to step S300.

If the determination result in step S102 is YES (ON), that is, if it is determined that the face recognition auto-tracking switch is turned on, the process of the face recognition auto-tracking mode is performed in the following manner.

First, the tracking processing unit 30 of the tracking device 16 starts to introduce frame images that are sequentially taken in the AF imaging circuit 24 of the lens device 12 to the image processing unit 26 (step S136). Subsequently, the tracking processing unit 30 performs the face recognition process for each image introduced to the image processing unit 26, and recognizes (detects) a person's face image(s) included in the image (step S138). Furthermore, even if a plurality of face images exist in the image, the flow advances to following step S140 when one face image is recognized. Further, when the tracking processing unit 30 detects a face image, a face frame of the recognized face image is superimposed and displayed on a shot video that is displayed on the viewfinder 18, by the frame display process.

Next, a pattern of the face image of the person recognized is sampled in step 138, and the pattern data stored in the database of the pattern data storage unit 32 is searched for an identical pattern (step S140).

Subsequently, it is determined as to whether or not a title for the detected face image is to be displayed on the viewfinder 18 (step S142). The operator can designate as to whether or not the title is to be displayed, by turning a predetermined switch ON/OFF.

If the determination result in step S142 is NO (OFF), the flow proceeds to step S150. If the determination result is YES (ON), then it is further determined as to whether or not pattern data that is the same as that of the detected face image is found in the pattern data registered in the database in the search of step S140 (step S144).

If the determination result in step S144 is YES, the registered title(s) corresponding to the pattern data, for example, "FUJI#1" or the like is displayed on the viewfinder 18 so as to correspond to the detected face image(s) (step S146). If the determination result in step S144 is NO, characters of "??" are displayed on the viewfinder 18 so as to correspond to the detected face image(s) (step S148). Thus, the operator can easily check as to whether or not each face image displayed on the viewfinder 18 is registered as a pattern.

If the process of step S146 or step S148 is completed, or, if the determination result in step S142 is NO, the auto-tracking process for automatically tracking the face image(s) detected in step S138 is started (step S150). At this time, a position(s) of the face frame(s) superimposed and displayed on the shot image on the viewfinder 18 is (are) moved in accordance with a position(s) of the face image(s) detected by the auto-tracking process.

When the process of step S150 is completed, then it is determined as to whether or not the above process has been performed for all face images included in the image (step S152). If no face image is newly detected in the face recognition process of the step S138, the determined process in this step S152 determines YES. Otherwise, the determination result becomes NO, and the flow returns to step S138 to repeat from the face recognition process.

If the determination result in step S152 is YES, then it is determined as to whether or not one or more face images of which pattern data are registered are found in the face image(s) detected in the processes of the step S136 to S152 (step S154).

If the determination result in step S154 is NO, the AF process in the lens device 12 is terminated (step S156), and the flows proceeds to step S300.

On the other hand, if the determination result in step S154 is YES, it is further determined as to whether or not a preset function is activated (step S158). That is, it is determined as to whether or not, among the switches 14*b* of the operation unit 14, a certain switch corresponding to a person whose pattern data is registered is turned on.

If the determination result in step S158 is NO (OFF), the face image of the AF target is selected based on a predetermined rule (step S160). For example, numbers are assigned to the switches 14*b* of the operation unit 14 in advance, and if a plurality of face images of persons whose pattern data are registered are detected, then one corresponding to the switch 14*b* having the smallest number is set as the AF target. If only one face image of a person whose pattern data is registered is detected, the face image is selected as the AF target.

Next, it is determined as to whether or not the face image, which is selected as the AF target in step S160, is different from the person of the face image, which is previously set as the AF target (step S162). In this step, if the determination result is YES, the face image of the AF target is changed to the selected face image (step S164). That is, the face frame of the selected face image or the frame having a predetermined size to include the face image is set as the AF frame (AF area). Then, the AF process in the lens device 12 is activated (step S166), and the flow proceeds to step S300.

If the determination result in step S162 is NO, the AF target is not changed, and the flow proceeds to step S166.

If the determination result in the step S158 is YES (ON), that is, if any one of the switches 14*b* of the operation unit 14 is turned on, it is determined as to whether or not the face image of the person corresponding to the switch, which is turned on, exists (step S168). If the determination result is YES, that person's face image is selected as the AF target (step S170), and the flow proceeds to step S162.

If the determination result in step S168 is NO, any face image is not set as the AF target (step S172), and the AF process in the lens device 12 is inactivated (step S174). Then, the flow proceeds to step S300.

Figure 4:
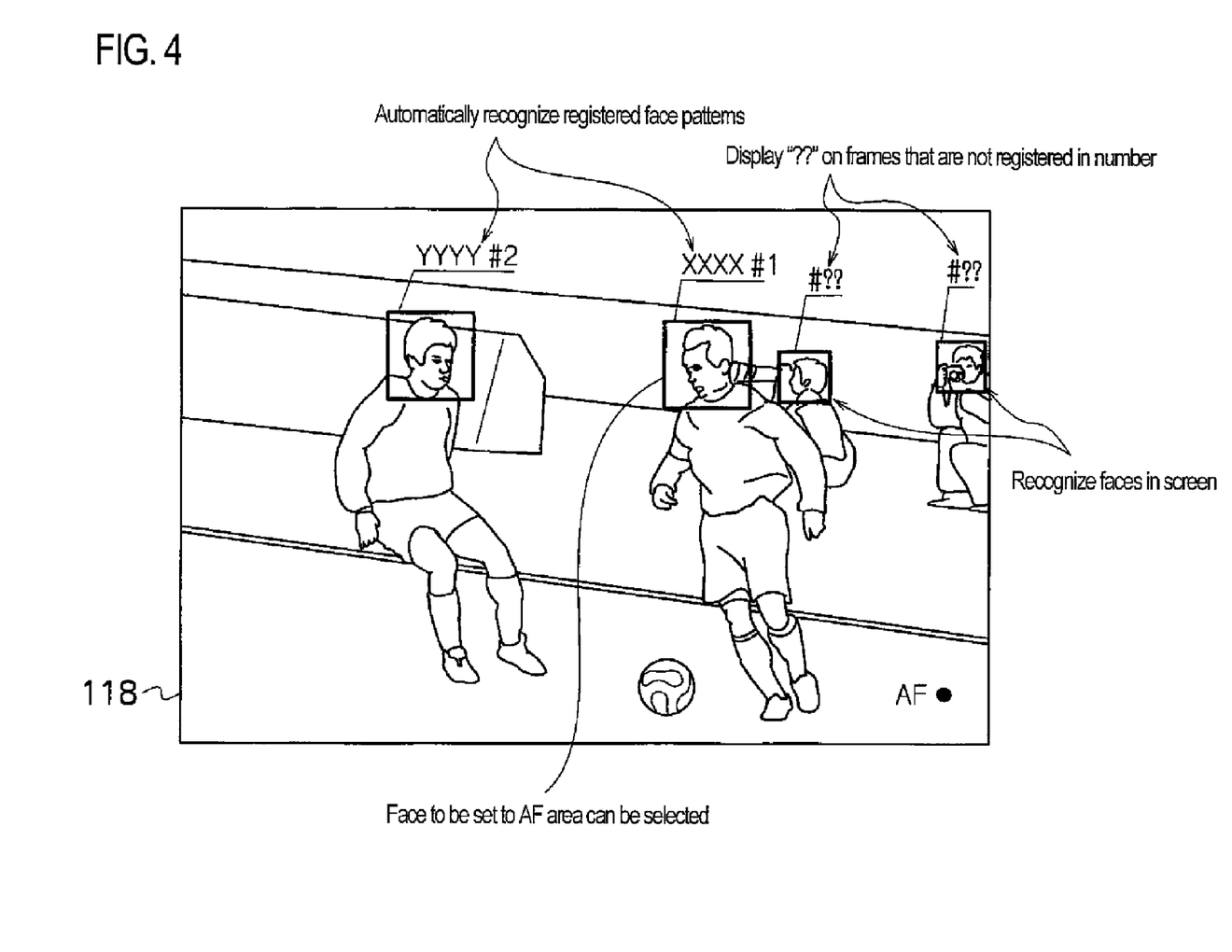
FIG. 4 is an explanatory diagram showing an example of an image displayed on a screen of a viewfinder.

FIG. 4 shows an example of an image displayed on the screen of the viewfinder 118 as a result of performing the face recognition auto-tracking mode. Shown in FIG. 4 is an image that is obtained when the auto-tracking is performed for a video of a soccer game, and face frames for recognized face images in the screen are indicated by, for example, light blue color.

Furthermore, a title(s) (such as a name, number, or the like) is displayed in the vicinity of face frame(s) of face image of which pattern data is registered. In the case of FIG. 4, face images of four persons are recognized, and two of them are the face images of the persons whose pattern data are registered. Thus, titles of those persons are displayed for the face images (face frame) as "XXXX#1" and "YYYY#2", respectively. Furthermore, since the face images of the persons who seem to be cameramen located behind in the screen have no registered pattern data, titles for those face images are displayed as "#??", and the operator can see that those persons are not registered.

Furthermore, information, other than "#??", indicating non-registration may be displayed for a face image whose pattern data is not registered. Furthermore, by use of the predetermined switch, the operator can select as to whether or not the title is displayed. Thus, since it becomes slightly difficult to see the screen if the title display is activated as shown in FIG. 4, the title display (which includes the information display indicating non-registration) may be inactivated so as to see the subjects more clearly.

Furthermore, when a plurality of persons' face images are detected in the screen, face frames are displayed for all face images. Thus, it is difficult to check which face image is set as the tracking target, which is to be tracked as the AF target. Accordingly, the face frame of the face image set as the tracking target, which is to be tracked as the AF target, that is, the AF frame is indicated in, for example, light blue color, and the other face frames are indicated in yellow color. However, the used colors are not limited to thereto. Furthermore, a different method may be used to distinguish a face image that is set as the tracking target to be tracked as the AF target from the other face images.

Also, the face frame of the face image, which is set as the tracking target to be tracked as the AF target, is not set as the AF frame, but an AF frame different from the face frame may be set in accordance with a position of the face frame of the face image, which is set as the tracking target to be tracked as the AF target, and may be displayed on the viewfinder 18.

Next, an imaging system to which the autofocus system according to another embodiment of the invention is applied will be described.

Figure 5:
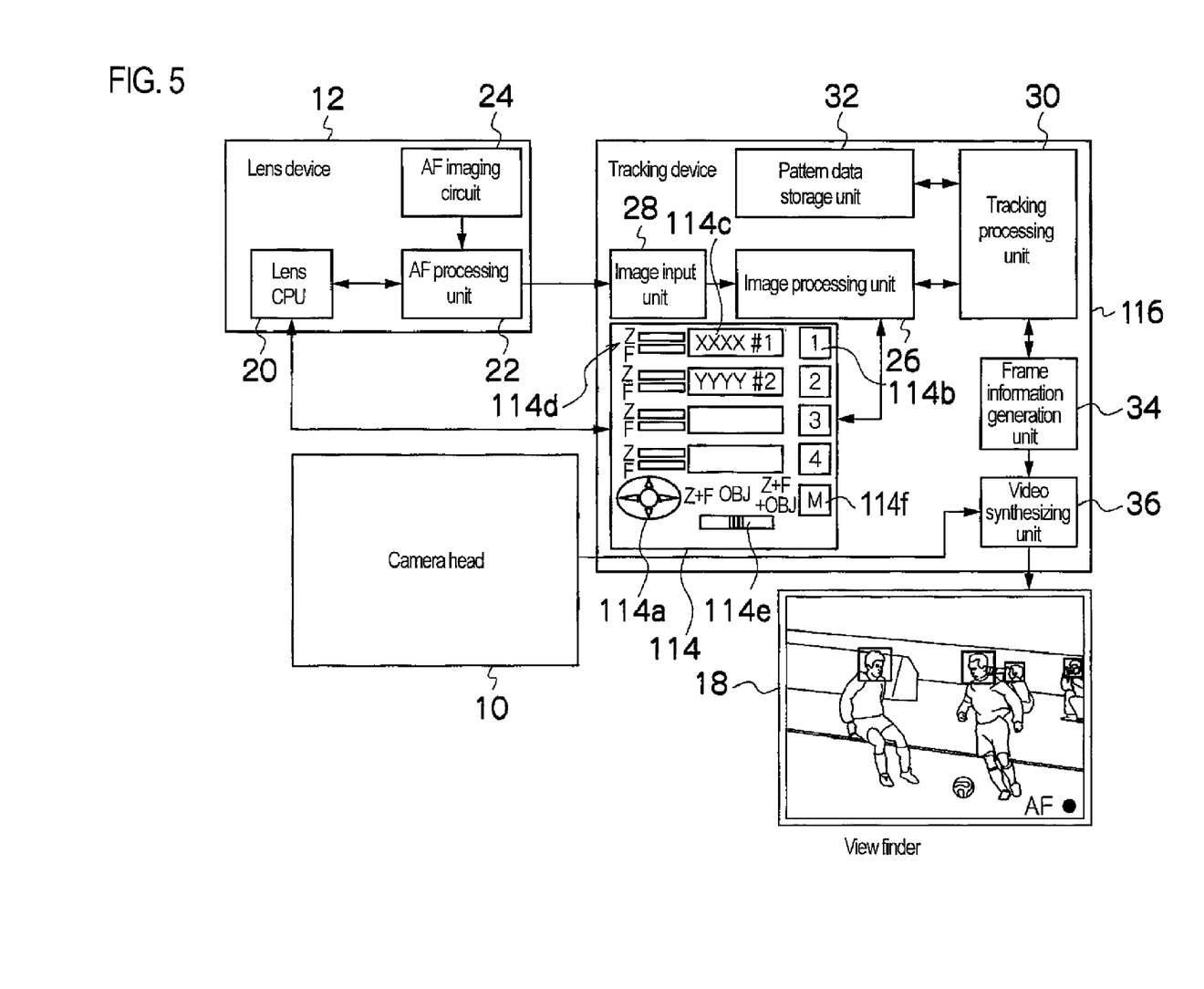
FIG. 5 is a block diagram showing another exemplary configuration of the imaging system to which the autofocus system according to an embodiment of the invention is applied.

FIG. 5 is a block diagram showing another exemplary configuration of the imaging system to which the autofocus system according to the invention is applied.

The imaging system shown in FIG. 5 has substantially the same configuration as the imaging system shown in FIG. 1. Elements identical or similar to those of the imaging system shown in FIG. 1 are referenced by the same reference numerals and signs as those of FIG. 1, and the description thereof is omitted. In the drawing, a tracking device 116 has the auto-tracking function as described in the flowchart of FIGS. 3A and 3B, and a zoom and focus preset function. For example, this tracking device corresponds to an aspect in which the auto-tracking function is provided in a device which is so-called a shot box having the preset function.

The preset function is a function in which the zoom and focus positions of the lens device 12 are previously registered, and zoom and focus positions that are set to optional positions can be changed (reproduced) to the previously registered positions by the predetermined switch operation. In the drawing, the configuration for performing the preset function is omitted, but in an operation unit 114, the configuration for performing the preset function is shown.

The operation unit 114 in the drawing includes: an arrow key 114a as an operation member for manually designating a moving direction and of an AF frame and a movement amount of the AF frame, instead of the track ball 14a; shot switches 114b for registering and reproducing preset positions of zooming (Z) and focusing (F) or registering and selecting tracking targets (person's face images); display panels 114c for checking registration of titles of the tracking targets; indicators 114d indicating the registered preset positions of the zooming (Z) and focusing (F); a slide switch 114e for switching a function (mode) of the tracking device 116; a memo switch 114f for giving an instruction for registering the preset positions and pattern data of a person's face; and the like.

In the tracking device 116 according to this embodiment, a preset function mode (Z+F mode) of zooming and focusing, a face recognition auto-tracking mode (OBJ mode), and a combination mode (Z+F+OBJ mode), and any of the three modes can be selected by changing a setting position of the slide switch 114e.

The Z+F mode is a mode for reproducing the preset positions of zooming and focusing, which is a normal function of the shot box. The OBJ mode is a mode for automatically tracking a specific person's face image as the AF target by the process of the face recognition auto-tracking mode described in the first embodiment. The combination mode is a mode in which the Z+F mode and the OBJ mode are combined, and is a mode for reproducing the preset positions of zooming and focusing and for automatically tracking a specific person's face image as the AF target by the process of the face recognition auto-tracking mode. Furthermore, the Z+F mode may be a mode for reproducing any one of zooming and focusing at the preset position.

Figure 6:
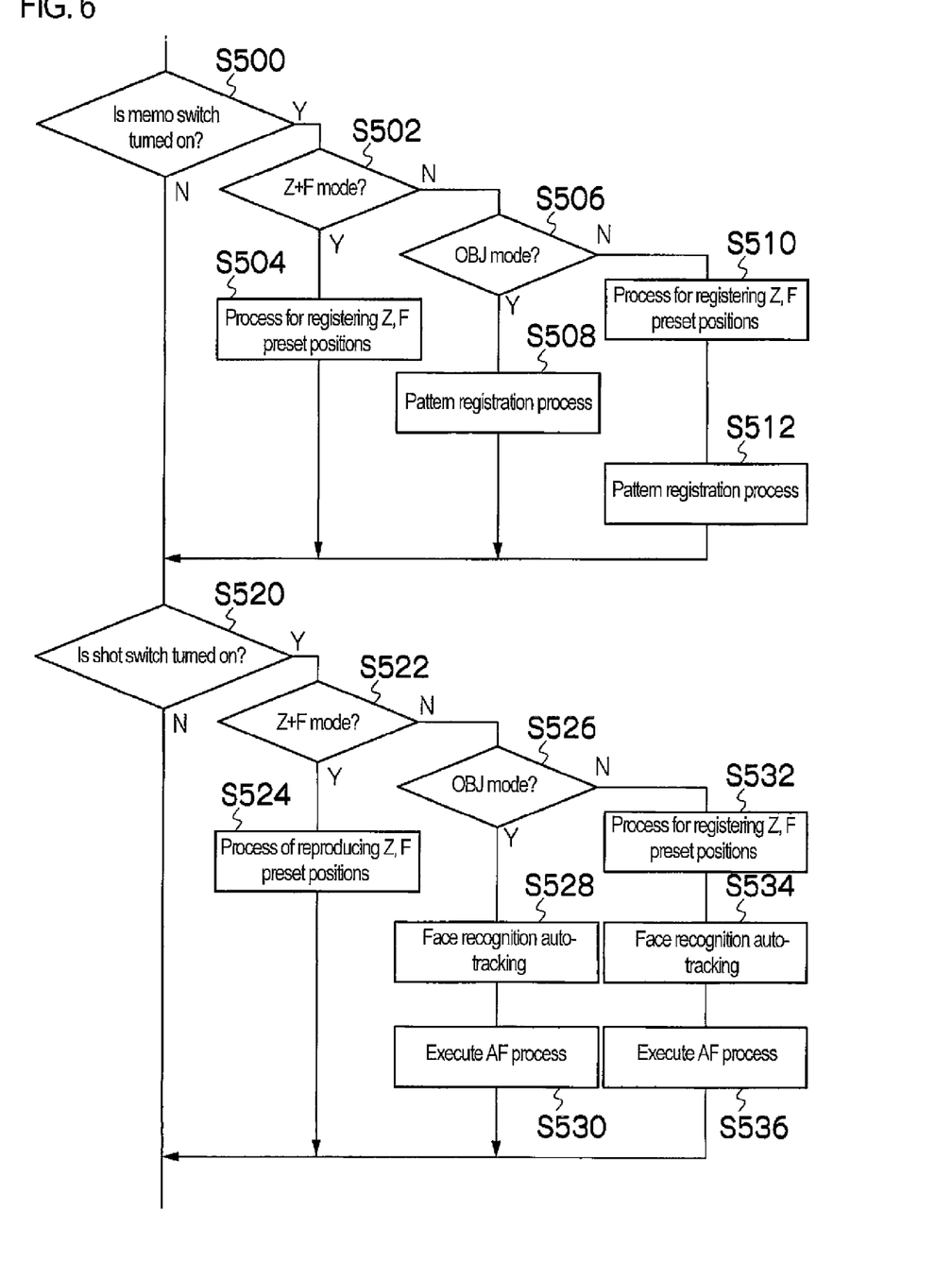
FIG. 6 is a flowchart showing process procedures for each of modes provided in a tracking device of the autofocus system shown in FIG. 5.

Referring to a flowchart of FIG. 6, processes for the respective modes of the tracking device 116 will be described. Furthermore, the flowchart shows a part of the processes performed in the tracking device 116, and the processes are repeatedly performed together with the other processes.

First, it is determined as to whether or not the memo switch 114f is turned on (step S500). If the determination result is YES, it is further determined as to whether or not the slide switch 114e is set to the Z+F mode (step S502). Here, if the determination result is YES, the process for registering the preset positions of zooming and focusing is performed (step S504). That is, among the four shot switches 114b numbered by 1 to 4 in FIG. 5, if an operator turns any one of the shot switches 114b on, the current zoom position and focus position of the lens device 12 are read by the tracking device 116, and the zoom position and the focus position are registered (stored) as preset positions corresponding to the on-state shot switch 114b. The registered preset positions are indicated by the indicator 114d, which corresponds to the shot switch 114b in which the preset positions are registered. Furthermore, the operator may not turn the shot switches 114b on, and the preset positions may be registered in association with the non-registration shot switches 114b in order from No. 1. When the process of step S504 is completed, the flow proceeds to step S520.

If the determination result in step S502 is NO, then it is determined as to whether or not the slide switch 114e is set to the OBJ mode (step S506). Here, if the determination result is YES, the pattern registration process for registering pattern data of a specific person's face image is performed (step S508). That is, the processes shown in steps S114 to S132 of the flowchart of FIG. 3A in the first embodiment are performed. At this time, it is possible to register pattern data of face images of different persons in the shot switches 114b of Nos. 1 to 4, respectively. However, in order to determine which pattern data is registered in which number's shot switch 114b, the operator may turn on the shot switch 114b of the number to register in a similar manner to that in the Z+F mode, and the pattern data may be registered in the non-registration shot switches 114*b* in order from No. 1. Furthermore, a title for distinguishing identifying a person of which the pattern data can be registered by a character input device (not shown in the drawings), and the title is displayed on the display panel 114*c* corresponding to the registered shot switch 114*b*. When the process of step S508 is completed, the flow proceeds to step S520.

If the determination result in step S506 is NO, the slide switch 114*e* is set to the Z+F+OBJ mode, and first, and the process for registering the preset positions of zooming and focusing is performed (step S510) in the same manner as step S504. Subsequently, the pattern registration process is performed (step S512) in a similar manner to step S508.

Thus, the preset positions of zooming and focusing and the pattern data of the face image are registered. These data are registered in association with the shot switch having the number turned on by the operator when the preset positions are registered. However, the operator may not turn the shot switches 114*b* on, and the preset positions and the pattern data of the face image may be registered in association with the non-registration shot switches 114*b* in order from No. 1. Furthermore, the registered preset positions are displayed on the indicators 114*d*, and the title of the registered person is displayed on the display panel 114*c*. When the process of step S512 is completed, the flow proceeds to step S520.

If the determination result in step S500 is NO, or if any one of the steps S504, S508, and S512 is completed, subsequently, it is determined as to whether or not any one of the shot switches 114*b* is turned on (step S520).

If this determination process determines YES, it is further determined as to whether or not the slide switch 114*e* is set to the Z+F mode (step S522). Here, if the determination result is YES, the process for reproducing (changing) the zooming and focusing of the lens device 12 to the preset positions, which is registered in association with the on-state shot switch (step S524). When the process of step S524 is completed, the process of the flowchart is completed, and the flow proceeds to another process.

If the determination result in step S522 is NO, then it is determined as to whether or not the slide switch 114*e* is set to the OBJ mode (step S526). Here, if the determination result is YES, the process of the face recognition auto-tracking mode as shown in steps S136 to S174 of FIG. 3B is performed, and a face image that coincides with the pattern data, which is registered in association with the on-state shot switch, is set as a tracking target to be automatically tracked as the AF target (step S528). Then, in the lens device 12, the AF process is performed (step S530). Further, in steps S136 to S174 of FIG. 3B, all face images included in the shot video are detected, and the detected face images are checked against all the face images of the persons whose pattern data are registered, thereby displaying the face frames and titles. However, in this embodiment, only the person's face image, which is registered in association with the shot data, may be detected, and the face image may be set as the tracking target to be tracked as the AF target. When the process of step S530 is completed, the process of the flowchart is completed, the flow proceeds to another process.

If the determination result in step S526 is NO, the slide switch 114*e* is set to the Z+F+OBJ mode, and first, the process is performed in a similar manner to step S524, in which the zooming and focusing of the lens device 12 are reproduced (changed) to the preset positions, which are registered in association with the on-state shot switch (step S532). Subsequently, in a similar manner to step S528, the process of the face recognition auto-tracking mode is performed. Then, the face image coinciding with the pattern data, which is registered in association with the on-state shot switch, is set as a tracking target to be automatically tracked as the AF target (step S534). Then, in the lens device 12, the AF process is performed (step S536). When the process of step S536 is completed, the process of the flowchart is completed, and the flow advances to another process.

Furthermore, in the operation unit 114 of FIG. 5, the four shot switches 114*b* are provided (the registered number is four). However, the number of the shot switches 114*b* is not limited to four.

Furthermore, the tracking device 116 of FIG. 5 can be used to select any of three modes of the Z+F mode, the OBJ mode, and the Z+F+OBJ mode by changing the setting position of the slide switch 114*e*. However, among these modes, any of only two modes may be adapted to be selectable. Furthermore, there may be provided Z+F+OBJ mode only.

As described above, in this embodiment, there has been described the case where the pattern data of the person's face image is registered, and in the face recognition auto-tracking mode, the registered face image is automatically tracked as the AF target. However, even if an object (subject) is not a face image, it is possible to automatically track the object by registering its pattern data in the same manner as that of the face image. For example, an object the same type as the registered object is detected from the shot image based on the shape patterns, colors, or the like which are common attributes of the same type object. Then, the registered object is detected from among the detected objects based on the pattern data, and it is possible to automatically tracking the registered object as the AF target.

What is claimed is:

1. An autofocus system comprising:
   an imaging unit that takes a subject image formed by an optical system;
   an autofocus unit that performs focus adjustment of the optical system so as to bring into focus a subject in a predetermined AF area in a shot image taken by the imaging unit;
   a pattern registration unit that registers pattern data for specifying a subject;
   a tracking target detection unit that detects a tracking target subject among subjects in the image taken by the imaging unit, based on the pattern data registered in the pattern registration unit;
   a tracking unit that moves the AF area in accordance with movement of the tracking target subject detected by the tracking target detection unit, wherein
      the tracking target detection unit includes a subject detection unit that detects at least one subject that is of a same type as the subject of the pattern data registered by the pattern registration unit, among the subjects in the image taken by the imaging unit, and
      the tracking target detection unit detects the tracking target subject among the at least one subject, which is detected by the subject detection unit, based on the pattern data registered by the pattern registration unit;
   a title registration unit that registers a title for identifying the subject of which the pattern data is registered when the pattern data is registered by the pattern registration unit; and
   a title display unit that, when the tracking target subject is detected by the tracking target detection unit, displays the title registered by the title registration unit in a screen of a viewfinder for displaying a currently shot image so that the displayed title corresponds to the detected subject, wherein the pattern registration unit registers plural pieces of pattern data for specifying a plurality of subjects, respectively, the title registration unit registers a plurality of titles for identifying the plurality of subjects of which pattern data are registered, respectively, the tracking target detection unit further includes
- a registration subject detection unit that detects at least one subject, which is registered by the pattern registration unit, from among the at least one subject, which is detected by the subject detection unit, based on the pattern data, which is registered by the pattern registration unit, and
- a tracking target determination unit that determines the tracking target subject from among the at least one subject detected by the registration subject detection unit, the tracking unit moves the AF area in accordance with movement of the tracking target subject determined by the tracking target determination unit of the tracking target detection unit, and the autofocus system further comprises:
- a frame display unit that displays a frame surrounding the at least one subject, which is detected by the subject detection unit, on the screen of the viewfinder, wherein
  - the title display unit displays on the screen of the viewfinder the title, which is registered by the title registration unit, with respect to the at least one subject, which is detected by the registration subject detection unit, and
  - the title display unit displays on the screen of the viewfinder information that indicates non-registration with respect to the subject, which is detected by the subject detection unit and is not registered by the pattern registration unit, and
  - an instruction unit that turns on/off displaying the title and displaying the information, which indicates non-registration, by of the title display unit.

2. The autofocus system according to claim 1, further comprising:
a selection unit that turns on/off displaying the title in the screen of the viewfinder.

3. The autofocus system according to claim 1, wherein the pattern registration unit causes the imaging unit to take the subject, reads pattern data of the shot subject from the taken image and registers the read pattern data of the shot subject.

4. The autofocus system according to claim 1, wherein the pattern data includes data representing a face of a specific person.

5. The autofocus system according to claim 1, wherein the pattern data includes data representing a face of a specific person, and
the subject detection unit recognizes a person's face image.

6. The autofocus system according to claim 1, wherein
the pattern registration unit registers plural pieces of pattern data for specifying a plurality of subjects, respectively,
the autofocus system further comprises
a tracking target designation unit that designates one subject from among the subjects of which pattern data are registered by the pattern registration unit, and
the tracking target detection unit detects the subject, which is designated by the tracking target designation unit, as the tracking target subject from among the at lease subject in the image taken by the imaging unit, based on the pattern data registered by the pattern registration unit.

7. The autofocus system according to claim 6, wherein
the autofocus system has a preset shooting function for setting at least one of zooming and focusing of the optical system to a preset position that is registered in advance, and
an operation member that is used in the preset shooting function is used as an AF tracking operation member that is used in the pattern registration unit and the tracking target designation unit, by changing a mode by a predetermined switch.

8. The autofocus system according to claim 1, further comprising:
a preset position registration unit that registers at least one preset position of zooming and focusing of the optical system in association with the tracking target subject, which is registered by the pattern registration unit, wherein
when the pattern registration unit gives an instruction to automatically track the subject of which pattern data is registered, the tracking target detection unit sets at least one of the zooming and focusing of the optical system to the preset position, which is registered by the preset position registration unit, and
when the AF area is moved in accordance with movement of the tracking target subject, which is detected by the tracking target detection unit, the tracking unit causes the autofocus unit to perform the focus adjustment so as to bring into focus the tracking target subject.

9. The autofocus system according to claim 1, wherein
the frame display unit displays the frame of the subject, which is determined as the tracking target by the tracking target determination unit, in a different color from that of a frame of a different subject.

* * * * *